United States Patent [19]

Ducos et al.

[11] Patent Number: 4,839,239
[45] Date of Patent: Jun. 13, 1989

[54] METALLIC COATING ON AN INORGANIC SUBSTRATE

[75] Inventors: Maurice P. Ducos, Mornas; André L. Serio, Meudon, both of France

[73] Assignee: TOTAL Compagnie Francaise des Petroles, Paris, France

[21] Appl. No.: 116,300

[22] Filed: Nov. 4, 1987

[30] Foreign Application Priority Data

Nov. 4, 1986 [FR] France .................. 86 15319

[51] Int. Cl.⁴ .................. B21D 39/00; B05D 1/08
[52] U.S. Cl. .................. 428/623; 427/34; 427/422; 427/423; 428/622; 428/632
[58] Field of Search .................. 427/423, 34, 422; 428/622, 623, 632

[56] References Cited

U.S. PATENT DOCUMENTS

| | | |
|---|---|---|
| 3,010,480 | 11/1961 | Ragsdale . |
| 3,620,808 | 11/1971 | Monroe .................. 427/423 X |
| 3,890,069 | 6/1975 | Telang .................. 427/34 |
| 3,967,017 | 6/1976 | Marten .................. 427/423 X |
| 3,977,840 | 8/1976 | Estep et al. .................. 428/622 X |
| 4,405,284 | 9/1983 | Albrecht et al. .................. 427/423 X |

FOREIGN PATENT DOCUMENTS

| | | |
|---|---|---|
| 0123952 | 11/1984 | European Pat. Off. . |
| 2545242 | 4/1977 | Fed. Rep. of Germany . |
| 1090257 | 3/1955 | France . |
| 1434158 | 2/1966 | France . |
| 453190 | 8/1936 | United Kingdom . |
| 949612 | 2/1964 | United Kingdom . |
| 989502 | 4/1965 | United Kingdom . |
| 1162390 | 8/1969 | United Kingdom . |
| 1207648 | 10/1970 | United Kingdom . |
| 1218662 | 1/1971 | United Kingdom . |
| 1257006 | 12/1971 | United Kingdom . |
| 1393031 | 5/1975 | United Kingdom . |
| 1434644 | 5/1976 | United Kingdom . |
| 1460229 | 12/1976 | United Kingdom . |

*Primary Examiner*—Shrive Beck
*Attorney, Agent, or Firm*—Sughrue, Mion, Zinn, Macpeak & Seas

[57] ABSTRACT

A metallic coating (20) is produced on a non-weldable inorganic substrate (6) by hot-spraying on a hot-sprayed intermediate layer (19) of refractory metal alloy chosen from nickel-chromium alloys and nickel and titanium aluminides. This intermediate layer itself may be deposited on an undercoat (18) of a ceramic chosen from aluminium and zirconium oxides and titanium hydrides, which is formed by hot-spraying on the inorganic substrate (6).

9 Claims, 3 Drawing Sheets

METALLIC COATING ON AN INORGANIC SUBSTRATE

BACKGROUND OF THE INVENTION

The invention relates to metallic coatings on natural or synthetic inorganic substrates such as stone, various rocks, sintered aluminium oxides, sintered or molten ceramic materials or any other non-weldable material.

SUMMARY OF THE INVENTION

It is known that metallic coatings can be produced on a substrate by the methods of hot-spraying an added material consisting of what is known as a "self-fluxing" metal alloy in the form of molten particles or in a pasty state which, owing to the effect of the speed to which they are subjected, are spattered onto the substrate, forming a more or less porous and more or less adherent layer. The added material may be in the form of solid wires, of cored wires, of sticks, of flexible cords, or of powders. The temperature to which the particles are heated may be achieved by gas combustion or by electric arcs. The speed of the particles, produced by the action of compressed gases in combustion flames or by plasma columns may vary from a few meters per second to several times the speed of sound. Flame guns are used for this hot-spraying, including detonation guns and electric arc guns including plasma generators.

It is also known that the deposited layer can be densified in order to remove porosities and to produce a leakproof metal deposit by melting this layer of a metal or of a metal alloy by heating, for example, using induction, gas, laser or an electron beam.

With an inorganic substrate, however, the problems of adhesion of the metallic coating are such that the production of a leakproof metallic coating on an inorganic substrate appeared impossible.

The object of the present invention is to make such a coating possible.

It provides an intermediate layer which can absorb stresses due to melting and to shrinkage of the metal alloy forming the metallic coating and which can, if the inorganic substrate is made up of several components, hold these temporarily in position during the spraying and the remelting of this metal alloy and can then contribute to their being held definitively in place.

According to one aspect of the present invention, there is provided a method of metallic coating on an inorganic substrate comprising the steps of hot-spraying a metal alloy onto a previously hot-sprayed intermediate layer of a refractory metal alloy comprising nickel-chromium alloys or nickel or titanium aluminide.

Preferably, the intermediate layer is itself deposited on an undercoat of a ceramic such as aluminium or zirconium oxides or titanium hydride, and is formed by hot-spraying on the inorganic substrate. This undercoat further improves the adherence of the intermediate layer to certain substrates and it can contribute to the retention in place of the components forming the substrate.

Measurement probes may be mounted on the inorganic substrate and are covered by said intermediate layer, which holds them in place. These probes are embedded either in a part of the thickness of the intermediate layer or in the said undercoat if the latter is present.

The thickness of the undercoat will generally be less than 0.5 mm and that of the intermediate layer, as well as that of the said metallic coating, will generally be less than 1 mm.

The metallic coating may have a roughened external surface acting as support for a thicker porous setting made of a metallic or ceramic material and deposited by hot-spraying. The thickness of this setting will generally be several millimeters in order to make it possible to produce a thermal insulation and to cause a fluid to circulate therein.

According to a second aspect of the invention, there is provided a metallic coating on an inorganic substrate comprising an intermediate layer of a refractory metal alloy comprising nickel-chromium alloys or nickel or titanium aluminide, and a layer of a metal alloy covering said intermediate layer.

BRIEF DESCRIPTION OF THE DRAWINGS

Embodiments of the invention will be described by way of example and with reference to the attached drawings, in which.

DETAILED DESCRIPTION OF THE PREFERRED EMBODIMENTS

Figure 1:
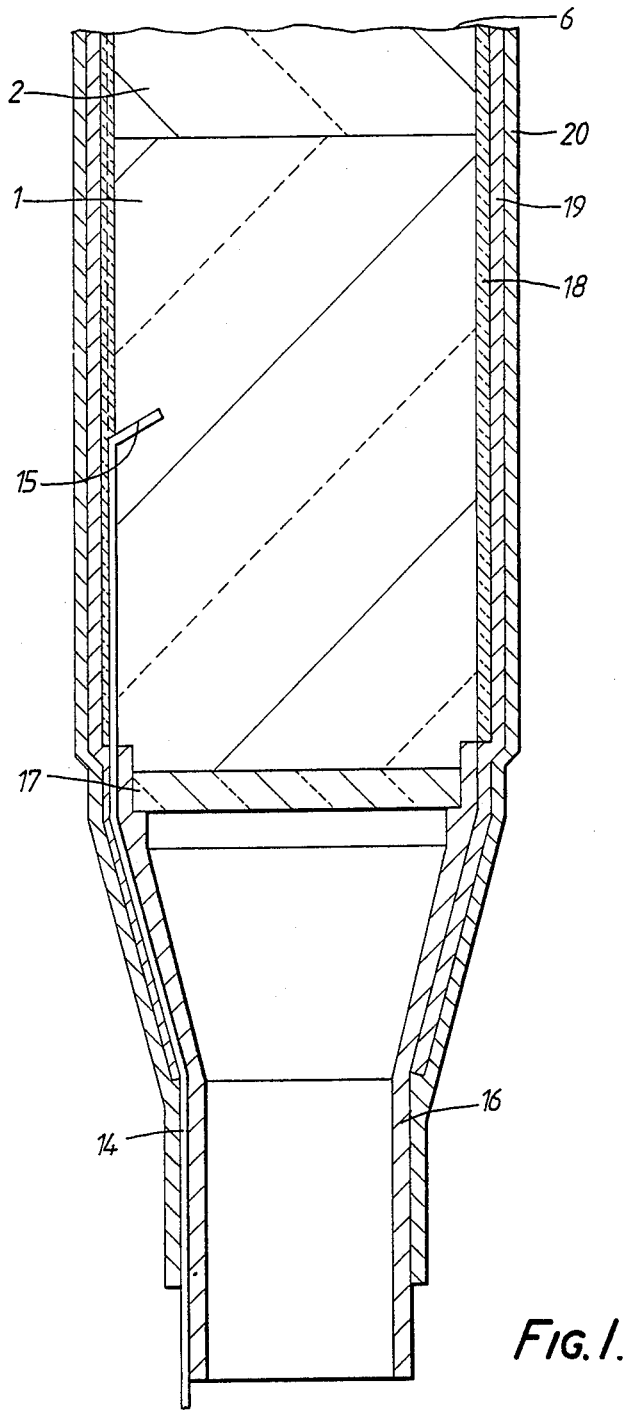
FIG. 1 is an axial section of a part of a substrate on which an undercoat, an intermediate layer and a leakproof metallic coating have been deposited.

In this example, the substrate consists of an axial series of cylindrical cores taken from a natural formation, for example thirty sandstone cores 60 mm in diameter and 100 mm in length and placed end to end and kept pressed against each other to form a substrate 3 meters in length in all. Two of these cores can be seen at 1 and 2 in FIG. 1 and three other cores 3,4,5 in FIG. 2. The equipment in FIG. 3 comprises a lathe on which the substrate 6 is held in axial compression between a mandrel 7 and a counterpoint 8 and is rotated. A trolley 10 carrying a spray gun 11 and a reel 12 for winding-on a cord feeding the gun travels lengthwise on the lathe bench 9. A suction hood 13 travels at the same time as the trolley 10.

Figure 2:
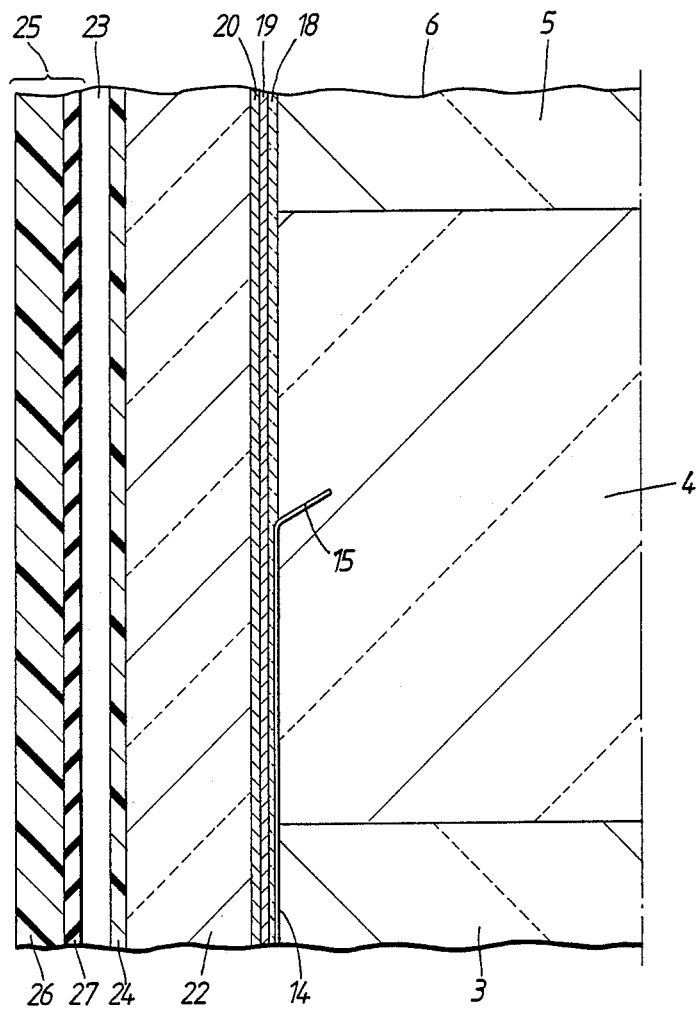
FIG. 2 is an axial section of a part of a substrate which has received the same deposits and in addition a thick external ceramic deposit.

FIGS. 1 and 2 show measurement probes 14, consisting in this case of thermocouples, whose working ends are introduced into holes 15 in the cores or are placed on the surface of the cores. These probes 14 extend lengthwise on the cores from the holes 15 or from housings which receive their working ends, to either of the two lengthwise ends of the axial series of cores. These probes 14 make it possible to determine the difference in temperature between the interior of the cores and their outer surface.

At the axial ends of the group of cores, tubular metal terminals 16 made of stainless steel and discs made of sintered material 17 are arranged to form, after a leakproof metallic coating has been produced on the group of cores, a conduit in which the discs 17 ensure a good distribution of a fluid through the cores. This fluid may consist, for example, of air, or of oxygen injected at a very high temperature and the combustion front thus produced may be followed. It is thus possible to reproduce in a laboratory the operating conditions similar to those existing at the depth from which the cores have been taken.

Figure 3:
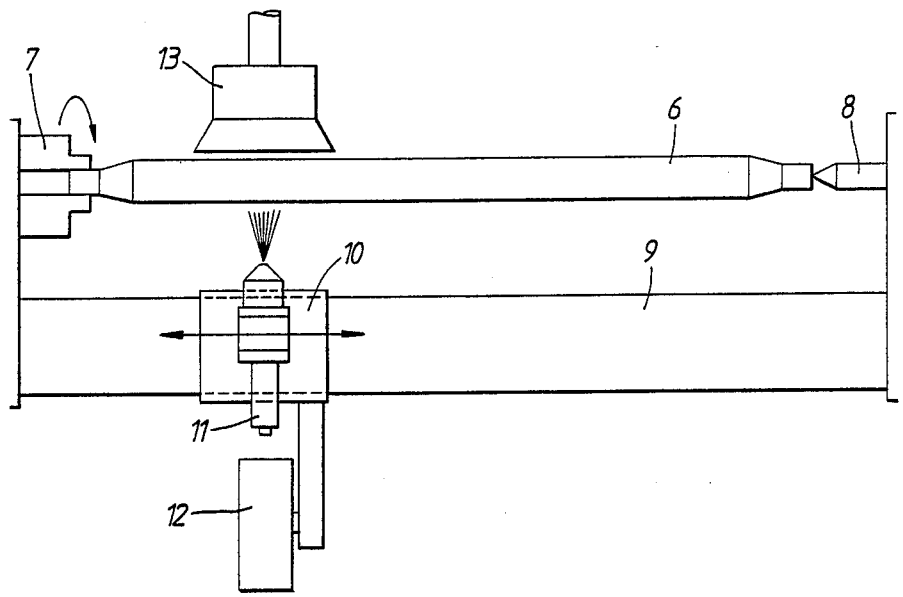
FIG. 3 shows the diagrammatically, in elevation, equipment for spraying added material onto a substrate.

A ceramic undercoat 18 is deposited on the axial series of cores by means of the equipment in FIG. 3, in which the spray gun 11 is an oxyacetylene flame gun fed by a flexible cord of the blue corundum type. The gun 11 is moved automatically lengthwise while the group of cores is rotated. A uniform undercoat whose thickness is, for example, 0.3 mm is thus obtained.

An intermediate layer 19, for example of 0.7 mm thickness, is deposited, using the same equipment but with a flexible nickel aluminide cord, onto this undercoat and onto a part of the terminals 16.

In similar manner, a metallic coating 20, for example 0.8 mm in thickness, is deposited on this intermediate layer 19 and also over part of the terminals 16, by means of the equipment in FIG. 3, in which the gun 11 utilises a self-fluxing, nickel-based flexible cord.

Figure 4:
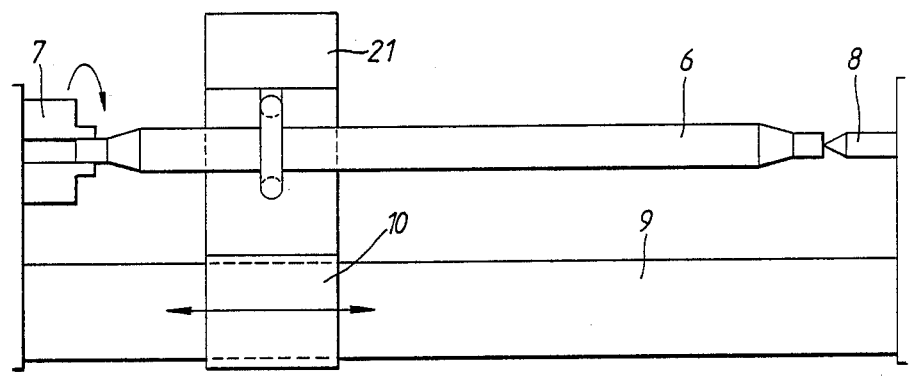
FIG. 4 shows diagrammatically, in elevation, equipment for remelting the metallic coating.

This metallic coating 20 is remelted by inductive heating using the equipment of FIG. 4, which comprises a lathe such as that of FIG. 3, but in which the trolley 10 carries a high-frequency generator 21.

A leakproof coating bonded in a leakproof manner to the terminals 16 is thus produced around the axial series of cores, holding the cores against each other and the measuring probes against the cores.

In the embodiment according to FIG. 2, a thick ceramic coating 22 is deposited on the metallic coating 20. To ensure the adhesion of this new deposit, the outer surface of the metallic coating 20 is scoured with a jet of abrasive, for example corundum, so as to roughen this surface, the roughness being between 6 and 15 $\mu$Ra. The adhesion is improved by depositing, by hot-spraying, an anchor layer of nickel aluminide containing 5% of aluminium, from 50 to 100 $\mu$m in thickness. The thick ceramic coating 22, for example 10 mm in thickness, which acts as a heat barrier, is sprayed hot onto this anchor layer. This thick coating 22 may, in particular, be produced using a cord of blue corundum alumina containing 3% of titanium oxide.

In the embodiment according to FIG. 2, an annular space 23 is formed between the coating 22 covered with a sealing layer 24 1 mm in thickness and made of a synthetic resin, and an outer casing 25 comprising an outer layer of coated Kevlar fibres 26 4 mm in thickness and an inner layer of synthetic rubber 27 1 mm in thickness. The outer casing 25 is held at its ends by conventional means of support which are not shown. The annular space 23 is, for example 2.5 mm in thickness and may be employed for circulating a coolant fluid.

We claim:

1. A method of metallic coating on an inorganic substrate including the steps of: hot-spraying on said inorganic substrate an intermediate layer of refractory material selected from the group consisting of nickel chromium alloys, nickel aluminide and titanium aluminide; and hot-spraying on said intermediate layer a layer of metal alloy, wherein the inorganic substrate comprises an elongate cylinder consisting of a plurality of cylindrical cores each taken from a natural formation and arranged axially end to end against each other.

2. A method according to claim 1, further comprising a preliminary step of hot-spraying an undercoat layer (18) of a ceramic selected from the group consisting of aluminium oxide, zirconium oxide and titanium hydride onto said inorganic substrate, said intermediate layer being deposited on said undercoat layer.

3. A method according to claim 1, wherein measurement probes (14) are mounted on said inorganic substrate to be covered and held in place by said intermediate layer.

4. A method according to claim 1, comprising the further steps of roughening the external surface of said metal alloy layer, and depositing thereon a thicker coating (22) of a material selected from the group consisting of metallic materials and ceramics.

5. A method according to claim 1, including the further step of remelting said metal alloy after hot-spraying to produce a leakproof coating.

6. A method according to claim 1, wherein said cores are provided with tubular terminals (16) at each end, and said metallic coating covers the cylinder of cores and also a part of said tubular terminals.

7. A metallic coating on an inorganic substrate comprising an intermediate layer of a refractory metal alloy selected from the group consisting of nickel-chromium alloys, nickel aluminide and titanium aluminide, and a layer of a metal alloy covering said intermediate layer, wherein said inorganic substrate comprises an elongate cylinder consisting of a plurality of cylindrical cores taken from a natural formation and arranged axially, end to end against each other.

8. A metallic coating according to claim 7, further comprising an undercoat layer (18) of a ceramic selected from the group consisting of aluminium oxide, zirconium oxide and titanium hydride.

9. A metallic coating according to claim 7, further comprising an outer thicker coating (22) of material selected from the group consisting of a metal or a ceramic, and deposited over a roughened external surface of said metal alloy.

* * * * *